United States Patent [19]
Munguia et al.

[11] Patent Number: 5,892,978
[45] Date of Patent: *Apr. 6, 1999

[54] COMBINED CONSECTIVE BYTE UPDATE BUFFER

[75] Inventors: Gabriel R. Munguia, Phoenix; Ned D. Garinger; Nicholas J. Richardson, both of Tempe, all of Ariz.

[73] Assignee: VLSI Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 685,809

[22] Filed: Jul. 24, 1996

[51] Int. Cl.$^6$ ........................................... G06F 13/00
[52] U.S. Cl. ........................... 395/853; 395/853; 395/854
[58] Field of Search ..................... 395/842, 859, 395/886, 310, 853, 383, 280, 854; 711/118, 136, 201, 100, 137

[56] References Cited

U.S. PATENT DOCUMENTS

| | | | |
|---|---|---|---|
| 4,805,098 | 2/1989 | Mills, Jr. et al. | 711/118 |
| 4,959,771 | 9/1990 | Ardini, Jr. et al. | 711/136 |
| 5,224,214 | 6/1993 | Rosich | 395/859 |
| 5,368,531 | 11/1994 | Blaner et al. | 711/201 |
| 5,377,338 | 12/1994 | Olson et al. | 395/842 |
| 5,416,907 | 5/1995 | Polzin et al. | 395/886 |
| 5,448,704 | 9/1995 | Spaniol et al. | 395/310 |
| 5,524,220 | 6/1996 | Verma et al. | 395/383 |
| 5,586,294 | 12/1996 | Goodwin et al. | 711/137 |
| 5,630,075 | 5/1997 | Joshi et al. | 711/100 |
| 5,668,967 | 9/1997 | Olson et al. | 395/842 |
| 5,761,443 | 6/1998 | Kranich | 395/280 |

OTHER PUBLICATIONS

Arimoto et al., "A circuit design of intelligent CDRAM with automatic write back capability", IEEE, pp. 79–80, 1990.

*Primary Examiner*—Wayne Amsbury
*Assistant Examiner*—Thuy Pardo
*Attorney, Agent, or Firm*—Wagner, Murabito & Hao

[57] ABSTRACT

An apparatus and method for minimizing bus traffic by combining write operations is disclosed. The present invention detects the occurrence of consecutive byte updates to a common 32-bit block. This is accomplished by using comparators to examine the addresses of consecutive write operations. If it is determined that the consecutive write operations are indeed to a common 32-bit block, they are combined. The address of the next write operation is also, similarly checked. All of the writes into that particular block are combined in a write combine register. The contents of this register is then transferred to a write buffer. When bus access is granted, the combined byte updates stored in the write buffer are issued in a single memory write cycle to the bus, thereby minimizing the number of write cycles actually required to transfer the data.

12 Claims, 4 Drawing Sheets

COMBINED CONSECTIVE BYTE UPDATE BUFFER

TECHNICAL FIELD

The present claimed invention relates to bus transactions. More specifically, the present claimed invention relates to a combine and store buffer for minimizing bus traffic in a computer system by combining write operations.

BACKGROUND ART

In its simplest terms, a computer system performs arithmetic operations, manipulates data, and performs tasks according to a series of instructions, called a "computer program." Virtually all computer systems include a central processing unit (CPU), a memory, an input/output (I/O), and a bus. In addition, there may be other devices (e.g., graphics accelerators, video chips, digital signal processors, sound cards, etc.) that are coupled onto the bus. Basically, the CPU executes the instructions of the computer program that is stored in memory. The I/O provides an interface between the user and the computer system. And the bus allows the different components of the computer system to communicate with each other.

The computer's bus plays a major role in the performance of the computer system. It is the bus, which conveys all the information and signals involved in the computer's operation. In most instances, it is imperative that large blocks of data be transferred as expeditiously as possible. For example, popular software applications prevalent today demand extremely fast updates of graphic images in order to move, resize, and update multiple windows without imposing unacceptable delays on the end user. Since the screen images are stored in video RAM, the processor must be able to update and move large blocks of data within video memory very quickly. This is especially the case when rendering images in real-time (e.g., video tele-conferencing, simulations, etc.). These applications are just a few examples which benefit substantially from fast bus transfer rates. Hence, it is imperative that data and information flow as fast as possible between the various components. Otherwise, a slow bus acts as a bottleneck which drags down the overall performance of the computer system, regardless of the microprocessor's speed or power.

In the past, a variety of bus standards have been implemented (e.g., ISA, EISA, Micro Channel bus, VLB, PCI, etc.). The ISA bus was the original standard of the PC industry. The EISA bus, the Micro Channel bus, and the VESA VL bus are all improvements over the ISA bus. However, the PC industry has presently adopted the PCI bus because of its high data transfer rate. The PCI bus can be accessed at clock speeds approaching that of the host processor's full native speed. However, notwithstanding the PCI's impressive speed characteristics, it can nevertheless become severely degraded as more and more devices are coupled onto the bus. The problem lies in the fact that bus access can only be granted to one device at any given time. If two or more devices request access to the bus, an arbitrator must arbitrate as to which device is allowed to transmit its data. Meanwhile, all other devices must wait until the bus again becomes available.

Furthermore, this problem is greatly compounded in those circumstances where devices are frequently required to transmit small amounts of data over the bus. For each write cycle, access to be bus must first be requested. Next, the request must be arbitrated. The requesting device must then wait for its access to be granted before data transmission can begin. Upon completion of data transmittal, the bus must be released. This entire process must be repeated for each write cycle, irrespective of how much data is actually transmitted. Clearly, much time and processing power is expended if only small amounts of data are transmitted during a write cycle. As a result, the throughput of the bus is greatly diminished.

Therefore, there is a need in the prior art for an apparatus and method for improving the utilization of a computer bus. It would be highly preferable if such an apparatus and method were to be compatible with existing bus standards, inexpensive to implement, and yet be highly effective. The present invention offers such a solution in the form a buffer that combines associated write operations in a manner whereby multiple writes can be transmitted in a single write cycle.

DISCLOSURE OF THE INVENTION

The present invention pertains to an apparatus and method for minimizing bus traffic by combining two or more write operations and transmitting the byte updates in a single memory write cycle. The present invention detects the occurrence of consecutive byte updates to a common 32-bit block. This is accomplished by using comparators to examine the addresses of consecutive write operations. The byte updates belonging to any consecutive write operations to a common 32-bit block are combined and temporarily stored in a write combine register. The address of the next write operation is also, similarly checked. All of the writes into that particular block are thusly combined and stored into the write combine register. The contents of this register are then transferred to a write buffer. A bus request signal is sent to the central arbiter. When bus access is granted, the combined byte updates stored in the write buffer are issued in a single memory write cycle to the bus, thereby minimizing the number of write cycles actually required to transfer the data.

In the currently preferred embodiment, the present invention supports a burst mode of operation, whereby multiple byte updates are transferred in bursts of data to sequential blocks of data. In addition, the present invention can be configured to organize non-contiguous byte updates into separate write cycles such that the byte updates associated with each write cycle is in a contiguous byte order. This contiguous byte data can then be burst over the bus.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
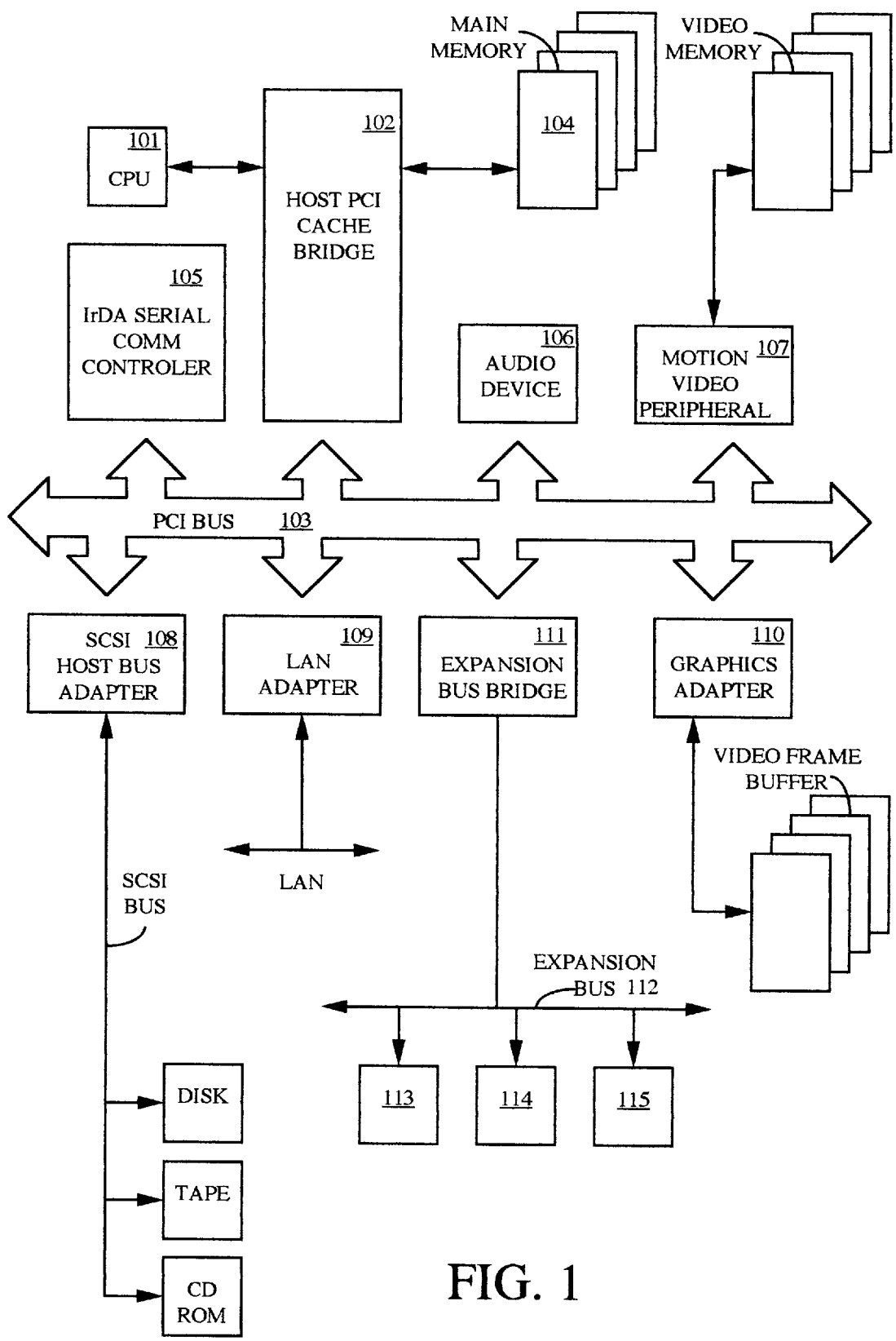
FIG. 1 shows an exemplary computer system upon which the present invention may be practiced.

FIG. 1 shows an exemplary computer system upon which the present invention may be practiced. The CPU 101 is coupled to a host PCI cache bridge 102, which serves as an interface to the PCI bus 103 and main memory 104. Additional devices, such as a controller 105, audio driver 106, video peripheral 107, SCSI bus adapter 108, LAN adapter 109, and graphics adapter 110, can be coupled to the PCI bus 103. An expansion bridge 111 may be used to add an expansion bus 112 onto PCI bus 103. Thereby, these additional devices 113–115 can communicate with devices 101–110 via expansion bus 112, bridge 111, and PCI bus 103.

Each of the devices desiring to perform write operations onto the PCI bus is required to have a bus master. The function of the bus master is to issue and accept arbitration signals. A central arbiter is used to decide which device is granted bus access. Basically, there are two dedicated arbitration signals that are required for each PCI bus master. A request (REQ#) signal is generated by the bus master of the device desiring exclusive access to the PCI bus. A second arbitration signal, the grant (GNT#) signal, is generated by the central arbiter in response to a request signal. The grant signal gives the requesting bus master permission for exclusive use of the PCI bus. The master must obey the rules specified in the PCI standards in acquiring, using, and relinquishing control of the bus. Bus acquisition may occur only when the GNT# signal is asserted and the PCI bus is in an Idle state (i.e., both FRAME# and IRDY# deasserted). The bus must be released at the end of a transaction if the GNT# signal has been deasserted.

Once bus access has been granted and prior to data transmittal, the present invention detects the occurrence of consecutive byte updates to a common 32-bit block. The data associated with multiple write operations to a common 32-bit block are combined. Thereupon, a single PCI memory write cycle is issued. Thereby, the combined data is transmitted over the PCI bus in a single memory write cycle. Consequently, the present invention minimizes bus traffic and associated arbitration latencies. Whereas previous designs added traffic to a limited-bandwidth bus resource by requiring that every memory write cycle occupy a transaction on a destination bus, the present invention reduces the number of required cycles on a destination bus by combining consecutive byte updates. For example, instead of WRITE A, WRITE A, WRITE B, the present invention combines the first two operations into WRITE (A+A), WRITE B. Thereby, instead of having three cycles the information can be transmitted with just two cycles.

Figure 2:
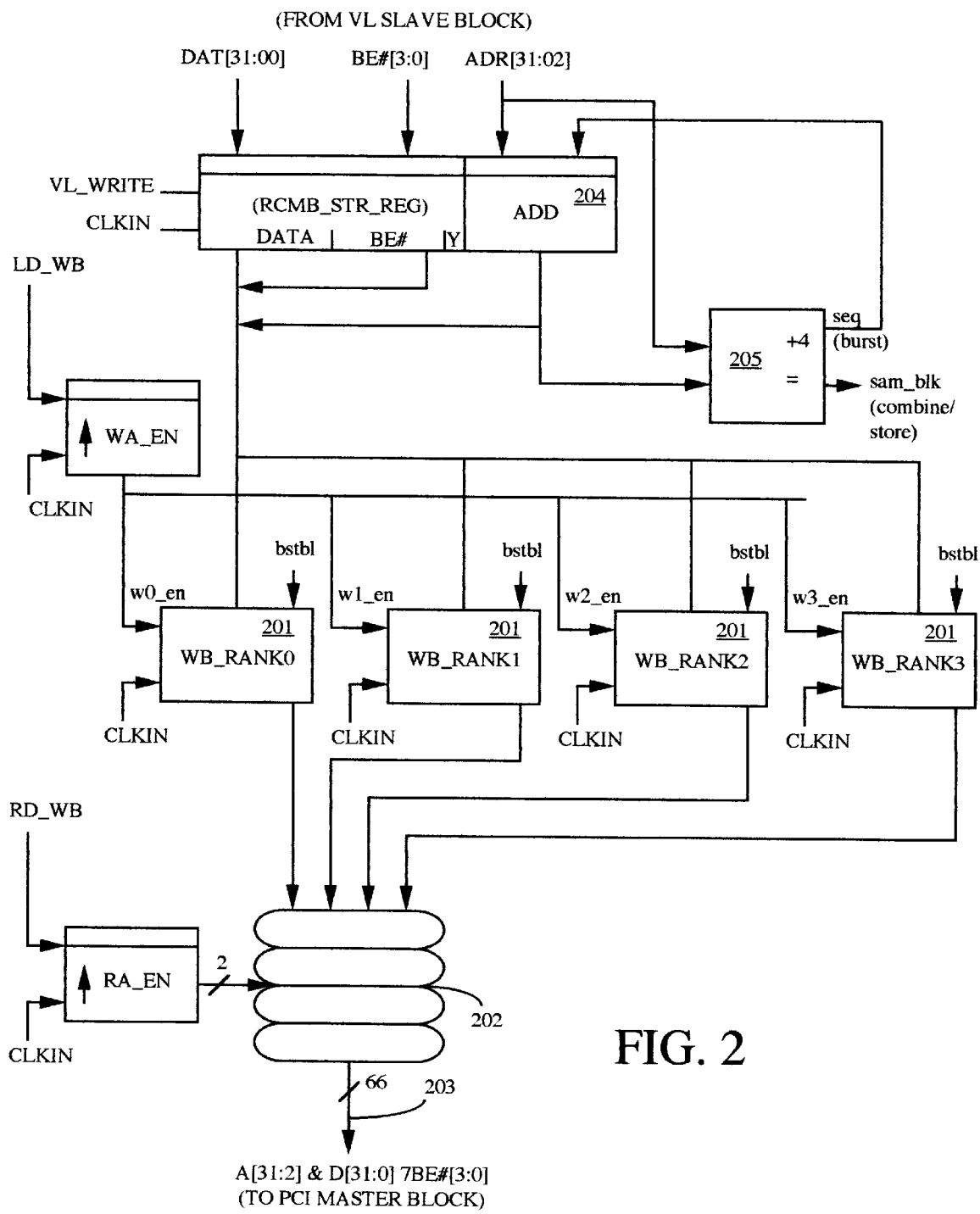
FIG. 2 shows a circuit diagram of the currently preferred embodiment of the combined consecutive byte update buffer of the present invention.

FIG. 2 shows a circuit diagram of the currently preferred embodiment of the combined consecutive byte update buffer of the present invention. In this design, a byte combine buffer 201 logically precedes a write buffer 202 for data destined for the PCI bus 203. A number of comparators 204 are used to compare the address of memory writes in order to detect consecutive memory writes to a common 32-bit block. These comparators 204 are also used to detect memory writes to sequential blocks. In the case of a common block, all memory writes are combined and stored within the byte combine buffer 201 before being "pushed" into the write buffer 202. This operation is similar to that associated with a one entry cache. It should be noted that once arbitration has been performed and the device has been granted access to the bus, it is desirable that the write operation be completed and the bus relinquished as quickly as possible. Hence, it is important that the combine, store, and purge functions be completed so that the bus is not starved for data once access has been granted.

In the case of a sequential block, the blocks may be tagged as "burstable" to allow a single burst write operation to proceed onto the PCI bus 203. To accommodate all PCI devices, this design can be configured to allow only contiguous-byte single memory cycles or block burst cycles. Register 205 outputs an active seq signal to indicate burst mode. Conversely, an active sam_blk signal indicates a combine/store function.

In one embodiment, the present invention is configured to separate non-contiguous byte updates into individual PCI cycles. This is done because some devices require that all PCI write operations contain only contiguous byte updates. If a block is marked as non-contiguous and burstable, the blocks will be burst with contiguous byte updates only. The following example illustrates how two sequential non-contiguous blocks can be burst in a contiguous byte order:

| | | |
|---|---|---|
| 1 = valid byte | | |
| mem write to add 1000 | block-0 | 0 1 0 1 |
| mem write to add 1004 | block-1 | 1 0 1 0 |
| | (addr=1000) | (addr=1004) |
| First burst (blk 0 &1) | 0 0 0 1 | 0 0 1 0 |
| Second burst | 0 1 0 0 | 1 0 0 0 |

In the above example, a worst case sequence of non-contiguous memory writes is shown. Writes of valid bytes 0 and 2 to block 0 of address 1000 and writes of valid bytes 1 and 3 to block 1 of address 1004 are requested. Conventionally, this would have required four separate PCI cycles (e.g., write valid byte 0 to block 0 at address 1000, write valid byte 1 to block 1 at address 1004, write valid byte 2, and write valid byte 4). However, in the present invention, the first burst includes byte enables for byte 0 of address 1000 and byte 1 of address 1004. The second burst includes byte enables for the remaining byte enables. Thereby, this minimizes the required number of cycles to two PCI sequences.

Figure 3:
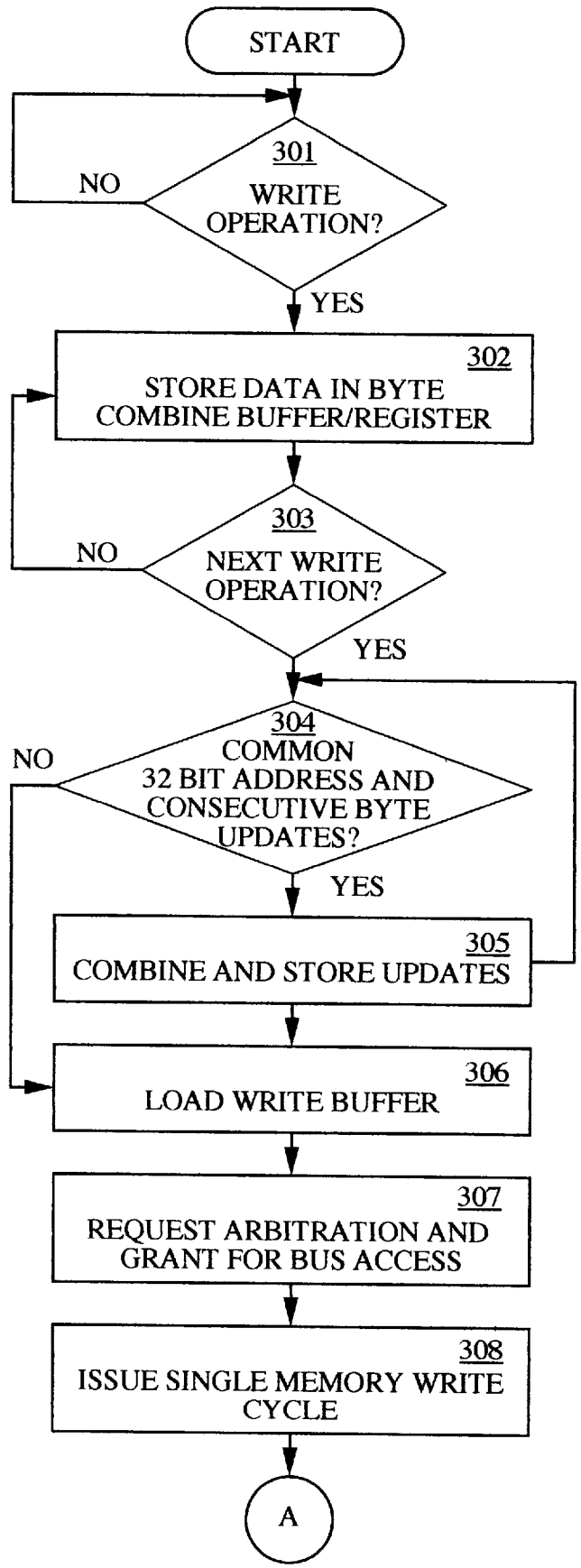
FIG. 3 is a flowchart describing the steps of combining consecutive writes according to the present invention.

FIG. 3 is a flowchart describing the steps of combining consecutive writes according to the present invention. In step 301, an initial write operation is detected. The data associated with that write operation is stored in a byte combine buffer or register, step 302. The device then waits for a subsequent write operation, step 303. When a subsequent write operation is detected, a determination is made as to whether it involves a consecutive update. If the bytes happen to be consecutive, they are combined and stored in the byte combine buffer/register, step 305. Additional consecutive bytes to the same 32-bit block are similarly combined, steps 304–305. When there are no more additional consecutive byte updates, the write buffer is loaded with the combined data, step 306. Next, the device generates a request signal to the central arbiter. The central arbiter arbitrates between a multitude of requests from various devices coupled to the bus and eventually responds with a grant signal, step 307. Thereupon, the address and data stored in the write buffer can immediate be purged onto the bus as a single memory write cycle, step 308.

Figure 4:
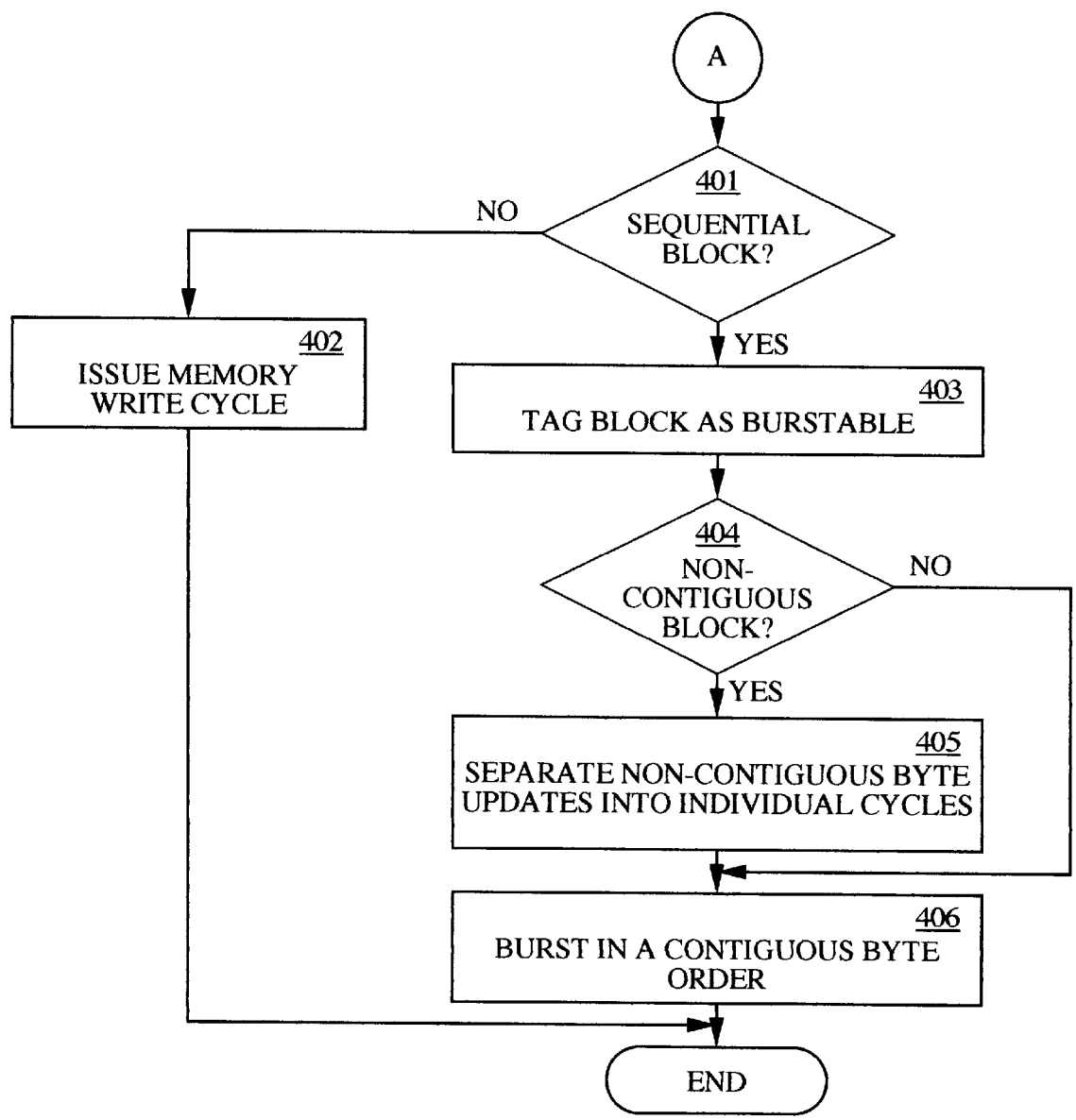
FIG. 4 is a flowchart describing a burst mode of operation that may be applied to the present invention.

FIG. 4 is a flowchart describing a burst mode of operation that may be applied to the present invention. The currently preferred embodiment of the present invention supports a burst mode of operation. In step 401, a determination is made as to whether the next 32-bit block is sequential. If the next 32-bit block is non-sequential, the device simply issues a standard memory write cycle. Otherwise, for a sequential block, step 402 designates that block as being "burstable." A burst transfer can now occur. A burst transfer consists of a single address phase followed by two or more data phases. The device initiating the data transfer arbitrates once for bus ownership. The start address and the transaction type are issued by the bus master during the address phase. The target device latches the start address into an address counter and is responsible for incrementing the address from data phase to data phase. This results in a fast and efficient transfer of data from the initiating device to the target device. The length of the burst is variable and is communicated between the initiator and target devices.

In order to support those devices which require that all write operations contain only contiguous byte updates (e.g., byte 0, byte 1, byte 2, etc.), all non-contiguous blocks must be identified, step 404. Once identified, any non-contiguous byte updates are then separated into different write cycles so that contiguity is established with respect to each individual write cycle, step 405. If the block were contiguous, step 405 is skipped. In step 406, the data is transferred over the bus in a burst operation in a contiguous byte order, step 406.

An example of a write operation is now described. Initially, the bus master of the device initiating the write operation sends a request signal to the central arbiter. In response, the center arbiter eventually returns a grant signal when the PCI bus next becomes available. The originating device must then wait for the PCI bus to become idle. This is accomplished by sampling the state of FRAME#, IRDY#, and GNT# signals. When both FRAME# and IRDY# are recognized as being inactive (e.g., 0 volts), this indicates that the bus is idle. Consequently, a transaction may be initiated by the bus master. The originating device now has ownership of the PCI bus. For the remainder of its transaction, the originating device carries out its write operation as the current bus master, or initiator.

When ownership is granted, the bus master of the originating device asserts FRAME# to indicate that the write operation has begun and that a valid start address and command are present on the bus. FRAME# remains asserted until the bus master is ready to complete the last data phase. At the same time that the bus master asserts FRAME#, it drives the start address onto the AD bus and the transaction type onto the Command/Byte Enable bus. Next, the bus master changes the information that it is presenting to the destination over the AD bus. During the write operation, the bus master is driving the AD bus during both the address and data phases. The bus master uses the Command/Byte Enable lines to indicate the bytes to be transferred and the data paths to be used during the first data phase. The bus master drives the combined write data from the write buffer onto the AD bus and asserts the respective byte enables to indicate the data paths that carry valid data. It also asserts IRDY# to indicate the presence of the data on the bus. The destination device decodes the address and command and asserts DEVSEL# to claim the data. In addition, the destination device asserts TRDY#, indicating its readiness to accept the first data item. Whereupon, the originating bus master and the destination bus master indicate that they are both ready to complete the first data phase by activating the TRDY# and IRDY# signals.

In the first data phase, the destination device accepts the first data item from the bus. The originating bus master drives the second data item onto the AD bus and sets the byte enables to indicate the bytes to be transferred and the data paths to be used during the second data phase. It also keeps IRDY# asserted and does not deassert FRAME#, thereby indicating that it is ready to complete the second data phase and that this is not the final data phase. Assertion of IRDY# indicates that the write data is present on the bus. During the following rising-edge clock, the originating bus master and the currently-addressed destination device receive both TRDY# and IRDY# as being activated. This indicates that they are both ready to complete the second data phase. The destination accepts the second data item from the bus, thus completing the second data phase. If the originating device requires more time before beginning to drive the next data item onto the AD bus, it can insert a wait state into the third data phase by deasserting IRDY#.

When FRAME# is deasserted, this indicates that the final data phase is in progress. An IRDY# active signal indicates that the originating device is still presenting the data. When the destination device asserts TRDY#, this indicates that it is ready to complete the final data phase. Next, both devices recognize that IRDY# and TRDY# are active. This indicates that they are ready to end the third and final data phase. In response, the third data phase is completed on the next rising-edge of the clock. The destination device accepts the third data item from the AD bus. Finally, the originating device ceases to drive the data onto the AD bus, relinquishes the C/BE bus, and deasserts IRDY#. This returns the bus to the idle state. Finally, the destination device deasserts TRDY# and DEVSEL#.

Thus, the present invention provides an apparatus and method for minimizing write cycles on a bus by combining consecutive byte updates that are contiguous within a 32-bit block. Furthermore, the present invention supports a burst mode of operation, even for non-contiguous blocks. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. In a computer system, an apparatus for combining a plurality of bytes of data for transmission over a bus in a memory write cycle, comprising:

a processor coupled to the bus for generating a first byte of data that is to be written to a first address and a second byte of data that is to be written a second address;

a comparator coupled to the processor for comparing the first address to the second address;

a register coupled to the comparator for combining the first byte of data with the second byte of data if the first address and the second address reference a same block of data;

a write buffer coupled to the register for storing a combined first byte and second byte of data, wherein the combined data is transmitted over the bus in a single memory cycle;

a controller coupled to the write buffer for identifying non-contiguous bytes of a first write operation and non-contiguous bytes of a second write operation which can be merged into a single 32-bit contiguous word, wherein at least one byte from the first write operation is merged with at least one byte from the second write operation into the single 32-bit word having a contiguous pattern.

2. The computer system of claim 1 further comprising a circuit for bursting data onto the bus if a following block of data is sequential.

3. The computer system of claim 1, wherein the block of data is 32 bits.

4. The computer system of claim 1, wherein the bus is comprised of a PCI bus.

5. In a computer system having a plurality of devices coupled to a bus, a method of minimizing write transactions over the bus, comprising the steps of:

detecting a first write operation and a second write operation;

determining whether the first write operation and the second write operation correspond to consecutive byte updates;

combining any consecutive byte updates;

storing the combined consecutive updates in a first memory;

determining whether a block of data is contiguous;

identifying and merging at least one non-contiguous byte having a first address with at least one non-contiguous byte having a second address into a single word having a contiguous byte sequence;

requesting access to the bus;

issuing a memory write cycle for transmission of the single word having the contiguous byte sequence when bus access is granted.

6. The method of claim 5 further comprising the steps of:

generating a request signal for requesting access to the bus;

arbitrating between a plurality of request signals;

generating a grant signal in response to the request signal when the bus becomes available.

7. The method of claim 5 further comprising the steps of:

determining whether a block of data is sequential;

designating the block of data as being burstable if the block is sequential;

bursting write data onto the bus if the block is burstable.

8. The method of claim 7, wherein the block of data is comprised of 32 bits of data.

9. The method of claim 5, wherein the bus is comprised of a PCI bus.

10. A computer system, comprising:

a bus;

a memory coupled to the bus for storing digital data;

a processor coupled to the bus for processing data, wherein the processor generates a first write operation to a first address of the memory and a second write operation to a second address of the memory;

a circuit coupled to the processor which places a first byte corresponding to a first write operation in a first write cycle, places a second byte corresponding to the first write operation which is not contiguous with the first byte in a second write cycle, places a third byte corresponding to a second write operation in the first write cycle such that the first byte is contiguous with the third byte, and places a fourth byte corresponding to the second write operation which is not contiguous with the third byte in the second cycle such that the second byte and the fourth byte are contiguous, wherein the first write cycle contains at least two contiguous bytes and the second write cycle contains at least two contiguous bytes.

11. The computer system of claim 10, wherein the data is transmitted over the bus in a burst mode of operation for sequential blocks of data.

12. The computer system of claim 10, wherein the bus is a PCI bus.

* * * * *